US010721683B2

(12) United States Patent
Fuleshwar Prasad et al.

(10) Patent No.: US 10,721,683 B2
(45) Date of Patent: Jul. 21, 2020

(54) METHOD AND SYSTEM FOR BATTERY LIFE IMPROVEMENT FOR LOW POWER DEVICES IN WIRELESS SENSOR NETWORKS

(71) Applicant: BlackBerry Limited, Waterloo (CA)

(72) Inventors: Mahendra Fuleshwar Prasad, Waterloo (CA); Michael Peter Montemurro, Toronto (CA); Stephen McCann, Southampton (GB); Jesse William Bennett, Apex, NC (US); Scott Leonard Dill, Paris (CA); James Randolph Winter Lepp, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 31 days.

(21) Appl. No.: 15/680,285

(22) Filed: Aug. 18, 2017

(65) Prior Publication Data
US 2019/0059050 A1    Feb. 21, 2019

(51) Int. Cl.
*H04W 52/02* (2009.01)
*H04W 4/70* (2018.01)
*H04W 40/24* (2009.01)
*H04W 88/16* (2009.01)

(52) U.S. Cl.
CPC ......... *H04W 52/0203* (2013.01); *H04W 4/70* (2018.02); *H04W 40/244* (2013.01); *H04W 52/0216* (2013.01); *H04W 52/0219* (2013.01); *H04W 52/0229* (2013.01); *H04W 88/16* (2013.01)

(58) Field of Classification Search
CPC . H04W 52/0203; H04W 4/70; H04W 40/244; H04W 88/16
See application file for complete search history.

(56) References Cited

U.S. PATENT DOCUMENTS

| 9,119,236 B1 | 8/2015 | Martin |
| 2004/0260427 A1 | 12/2004 | Wimsatt |
| 2005/0275541 A1 | 12/2005 | Sengupta |
| 2006/0020972 A1 | 1/2006 | Regan |
| 2008/0037431 A1 | 2/2008 | Verb et al. |
| 2009/0040039 A1 | 2/2009 | Kaneko |
| 2009/0088605 A1 | 4/2009 | Ross et al. |
| 2009/0310572 A1 | 12/2009 | Wang |
| 2010/0008272 A1 | 1/2010 | Messinger et al. |

(Continued)

OTHER PUBLICATIONS

European Patent Office, Extended European Search Report for Appl. No. 18189420.5 dated Dec. 4, 2019 (8 pages).

(Continued)

*Primary Examiner* — Dady Chery
(74) *Attorney, Agent, or Firm* — Trop, Pruner & Hu, P.C.

(57) ABSTRACT

A method at a sensor module within a sensor system for communicating with a gateway, the method including storing a timing profile for communications with the gateway; waking a radio core of the sensor module at a threshold time prior to a beacon signal being expected from the gateway; sampling a channel for the beacon signal at the radio core; if the beacon signal is detected: waking a processor on the sensor module; exchanging communication with the gateway; and powering down the processor and radio core upon completion of the exchanging communication.

17 Claims, 11 Drawing Sheets

(56) References Cited

U.S. PATENT DOCUMENTS

| | | |
|---|---|---|
| 2010/0305779 A1 | 12/2010 | Hassan |
| 2012/0078429 A1 | 3/2012 | Weston |
| 2013/0012220 A1 | 1/2013 | Waris |
| 2013/0226357 A1 | 8/2013 | Ersavas |
| 2013/0235773 A1* | 9/2013 | Wang ................ H04W 52/0206 370/311 |
| 2013/0335219 A1 | 12/2013 | Malkowski |
| 2014/0120962 A1 | 5/2014 | Merlin |
| 2014/0126461 A1 | 5/2014 | Ghosh |
| 2014/0341105 A1 | 11/2014 | Vardhan |
| 2017/0019853 A1 | 1/2017 | Ghosh et al. |
| 2017/0078195 A1 | 3/2017 | Raman |
| 2017/0214620 A1 | 7/2017 | Haleem |
| 2018/0097572 A1 | 4/2018 | Shibata et al. |
| 2018/0097825 A1 | 4/2018 | Pavlas |
| 2019/0159281 A1* | 5/2019 | Amin |

OTHER PUBLICATIONS

U.S. Appl. No. 15/948,464, Non-Final Rejection dated Aug. 6, 2019, pp. 1-14 and attachments.

European Patent Office, Communication pursuant to Article 94(3) EPC for Application No. 18189420.5, dated Nov. 13, 2019 (5 pages).

* cited by examiner

METHOD AND SYSTEM FOR BATTERY LIFE IMPROVEMENT FOR LOW POWER DEVICES IN WIRELESS SENSOR NETWORKS

FIELD OF THE DISCLOSURE

The present disclosure relates to power saving techniques for Internet of Things (IOT) devices, and in particular relates it to power saving during communication for IOT devices.

BACKGROUND

Many Internet of Things (IOT) devices are power limited devices that are not connected to external power sources. For example, such power limited devices tend to be powered by sources such as batteries, fuel cells or other similar options.

Often, such power limited devices need to operate for a significant amount of time without being connected to an external power source. This means that the devices need to operate with low power consumption. However, such devices also need to perform the functionality for which they are intended. For example, in a sensor network, the gateway, sensor module and sensors need to communicate information. Monitoring and controlling the sensors or sensor parameters is crucial and should be done in real time or almost real time without loss of data in many cases.

In such scenario, it is extremely challenging to achieve battery life targets for low-power IOT devices. Often wireless sensor modules, when sending data, will consume a significant amount of power.

BRIEF DESCRIPTION OF THE DRAWINGS

The present disclosure will be better understood with reference to the drawings, in which.

DETAILED DESCRIPTION OF THE DRAWINGS

Figure 1:
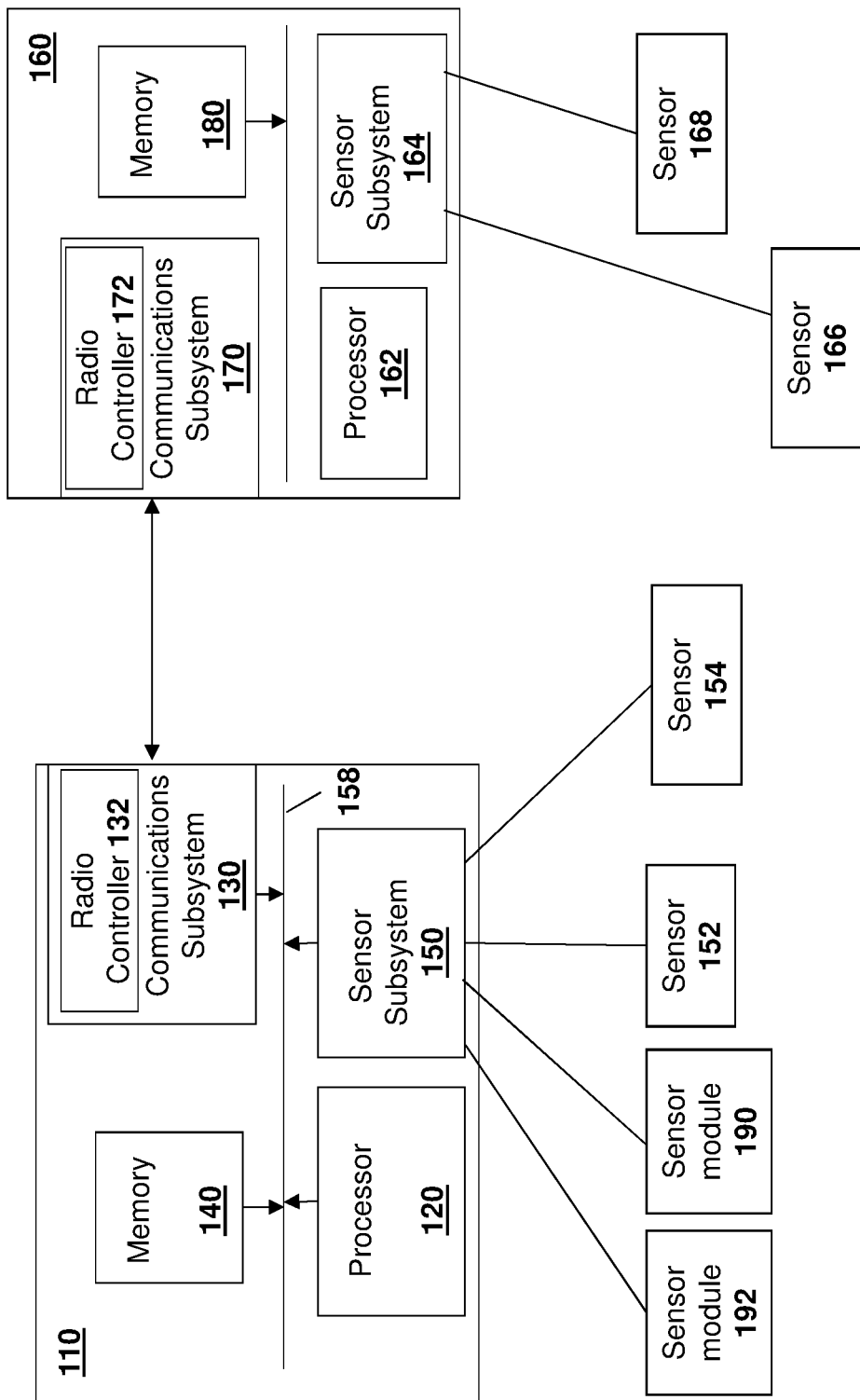
FIG. 1 is a block diagram showing an example gateway and sensor module capable of being used in accordance with the embodiments of the present disclosure.

The present disclosure provides a method at a sensor module within a sensor system for communicating with a gateway, the method comprising storing a timing profile for communications with the gateway; waking a radio core of the sensor module at a threshold time prior to a beacon signal being expected from the gateway; sampling a channel for the beacon signal at the radio core; if the beacon signal is detected: waking a processor on the sensor module; exchanging communication with the gateway; and powering down the processor and radio core upon completion of the exchanging communication.

The present disclosure further provides a sensor module within a sensor system configured for communicating with a gateway, the sensor module comprising: a processor; and a communications subsystem, wherein the sensor module is configured to: store a timing profile for communications with the gateway; wake a radio core within the communications subsystem of the sensor module at a threshold time prior to a beacon signal being expected from the gateway; sample a channel for the beacon signal at the radio core; if the beacon signal is detected: wake the processor on the sensor module; exchange communication with the gateway; and power down the processor and radio core upon completion of the exchanging communication.

The present disclosure further provides a computer readable medium for storing instruction code, which, when executed at a sensor module cause the sensor module to: store a timing profile for communications with the gateway; wake a radio core of the sensor module at a threshold time prior to a beacon signal being expected from the gateway; sample a channel for the beacon signal at the radio core; if the beacon signal is detected: wake a processor on the sensor module; exchange communication with the gateway; and power down the processor and radio core upon completion of the exchanging communication.

As provided above, it is extremely challenging to achieve a battery life target for low-power IOT devices such as a sensor module or gateway. Specifically, in a sensor network, often wireless sensor modules are capable of measuring sensor parameters in low power mode. However, the sending of measured sensor data consumes a significant amount of power and poses a challenge to ensure no loss of information.

In a typical system, to ensure a wireless gateway or hub does not lose data, the gateway or hub should always be powered on and should be listening to all sensor modules. However, this consumes a significant amount of power and is not practical from a battery perspective when operating a power limited wireless sensor network.

Similarly, on the wireless sensor module, to save power, the sensor modules typically wake-up and send data to the wireless hub or gateway at predefined intervals or when some critical event occurs.

If a power limited wireless gateway is not designed to accept data from sensor modules whenever such sensor module transmits, the wireless sensor module will either be kept on for a longer duration or will need to send the same data in the next cycle at a predefined update. Both these options impact the battery life of a low-power battery-operated wireless sensor module significantly.

Further, as more sensor modules are added to a sensor network, it becomes more challenging for a gateway to gather the data while maintaining a battery life target.

In some embodiments, the wireless sensor module may be created by a third party and may not be configurable. In this case, it may be difficult to develop gateways that gather data from these third-party sensor modules while maintaining a battery life target.

In order to overcome the above, embodiments of the present disclosure allow for configuration of one or both of the wireless sensor module and the wireless gateway to operate in a low power mode and wake-up only when either the wireless sensor modules or gateways have some data to be transferred between them.

The present disclosure is described with regards to sensor systems. However, the synchronization of the modules and exchange of data could be equally used with other systems in which power limited devices need to communicate with each other. As such, the present disclosure is not limited to sensor systems.

Using the example of a sensor system, one sensor system is shown with regard to FIG. 1. The sensor system of FIG. 1 is however merely an example and other sensor systems could equally be used in accordance with the embodiments of the present disclosure.

Reference is now made to FIG. 1, which shows an example sensor system. The sensor system of FIG. 1 includes a gateway 110, which can be any computing device or network node. In some embodiments, gateway 110 may also be referred to as a hub. Such computing device or network node may include any type of electronic device, including but not limited to, mobile devices such as smartphones or cellular telephones. Examples can further include fixed or mobile devices, such as IOT devices, endpoints, home automation devices, medical equipment in hospital or home environments, inventory tracking devices, environmental monitoring devices, energy management devices, infrastructure management devices, vehicles or devices for vehicles, fixed electronic devices, among others.

Gateway 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example different radio technologies.

Communications subsystem 130 allows gateway 110 to communicate with other devices or network elements. Communications subsystem 130 may use one or more of a variety of communications types, including but not limited to cellular, satellite, Bluetooth™, Bluetooth™ Low Energy (BLE), Wi-Fi, wireless local area network (WLAN), wireless personal area networks (WPAN), near field communications (NFC), ZigBee or any other IEEE 802.15 low power technology, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

One or more of the radios within communications subsystem 130 may include a radio controller 132. Such radio controller can operate to determine if a radio within communications subsystem 130 is receiving signals that need to be processed in one embodiment. For example, the radio controller 132 can detect if BLE communications from another component of the sensor system are trying to communicate with the gateway 110.

Processor 120 generally controls the overall operation of the gateway 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, gateway 110 may access data or programmable logic from an external storage medium, for example through communications subsystem 130.

In the embodiment of FIG. 1, gateway 110 may utilize a plurality of sensors, which may either be part of gateway 110 in some embodiments or may communicate with gateway 110 in other embodiments. For internal sensors, processor 120 may receive input from a sensor subsystem 150.

For external sensors, sensors 152 and 154 are shown in the embodiment of FIG. 1.

Examples of sensors include, but are not limited to, a positioning sensor, a vibration sensor, a temperature sensor, one or more image sensors, accelerometer, light sensors, gyroscopic sensors, or other sensors. Other sensors may be any sensor that is capable of reading or obtaining data that may be useful for gateway 110. However, such list of sensors is merely provided as an example, and in other embodiments different sensors or a subset of sensors may be used.

In other embodiments, gateway 110 may not have any sensors, either internal or external, associated directly to it. For example, in some embodiments, gateway 110 may instead communicate with sensor modules, as described below.

Communications between the various elements of gateway 110 may be through an internal bus 158 in one embodiment. However, other forms of communication are possible.

A sensor system may further include one or more sensor modules. A sensor module is a system that allows communication from various sensors, where data can be received, stored, compiled, and/or processed prior to being passed to another element in the system, such as gateway 110.

For example, in the embodiment of FIG. 1, a sensor module 160 is shown. Sensor module 160 comprises a processor 162 and at least one communications subsystem 170, where the processor 162 and communications subsystem 172 cooperate to perform the methods of the embodiments described herein. Communications subsystem 170 may, in some embodiments, comprise multiple subsystems, for example different radio technologies.

Communications subsystem 170 allows sensor module 160 to communicate with other devices or network elements. Communications subsystem 170 may use one or more of a variety of communications types, but would typically use short range communication such as, but not limited to Bluetooth™, BLE, Wi-Fi, WLAN, WPAN, NFC, ZigBee or other IEEE 802.15 low power technology, or wired connections such as Ethernet or fiber, among other options.

As with communications subsystem 130, a communications subsystem 170 will typically have one or more receivers and transmitters, as well as associated components such as one or more antenna elements, local oscillators (LOs), and may include a processing module such as a digital signal processor (DSP). Again, the particular design of the communication subsystem 170 will be dependent upon the communication network or communication technology on which the sensor module is intended to operate.

One or more of the radios within communications subsystem 170 may include a radio controller 172. Such a radio controller can operate to determine if a radio within the communications subsystem 170 is receiving signals that need to be processed in one embodiment. For example, radio controller 172 can detect if BLE communications from another component of the sensor system is being used to try to communicate with the sensor module 160.

Processor 162 generally controls the overall operation of the sensor module 160 and is configured to execute programmable logic, which may be stored, along with data, using memory 180. Memory 180 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 180, sensor module 160 may access data or programmable logic from an external storage medium, for example through communications subsystem 170.

In the embodiment of FIG. 1, sensor module 160 may utilize a plurality of sensors, which may either be part of sensor module 160 in some embodiments or may communicate with sensor module 160 in other embodiments. For internal sensors, processor 162 may receive input from a sensor subsystem 164.

For external sensors, sensors 166 and 168 are shown in the embodiment of FIG. 1.

Gateway 110 may communicate with zero, one, or a plurality of sensor modules. In the example of FIG. 1, in addition to sensor module 160, gateway 110 communicates with sensor modules 190 and 192.

In a sensor system, typically the gateway 110 will communicate with external network resources, while sensor module 160 will typically communicate internally, for example with the gateway 110, other sensor modules, or sensors.

The sensor system, including gateway 110, may be affixed to any fixed or portable platform. For example, gateway 110 may be affixed to shipping containers, truck trailers, truck cabs in one embodiment. In other embodiments, gateway 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising, among others.

In other cases, gateway 110 could be carried by a user.

In other cases, gateway 110 may be affixed to stationary objects including buildings, lamp posts, fences, cranes, temporary fixtures such as emergency shelters and tents, among other options.

Such sensor system, and specifically gateway 110, sensor modules 160, 190 or 192, or sensors 152, 154, 166 or 168 may be a power limited devices. For example, gateway 110 could be a battery operated device that can be affixed to a shipping container or trailer in some embodiments. Other limited power sources could include any limited power supply, such as a small generator or dynamo, a fuel cell, solar power, among other options.

In other embodiments, components of the sensor system including gateway 110 may utilize external power, for example from the engine of a tractor pulling the trailer, from a land power source for example on a plugged in recreational vehicle or from a building power supply, among other options.

External power may further allow for recharging of batteries to allow the sensor system components such as gateway 110 to then operate in a power limited mode again. Recharging methods may also include other power sources, such as, but not limited to, solar, electromagnetic, acoustic or vibration charging.

The sensor system from FIG. 1 may be used in a variety of environments. One example environment in which the sensor system may be used is shown with regard to FIG. 2.

Figure 2:
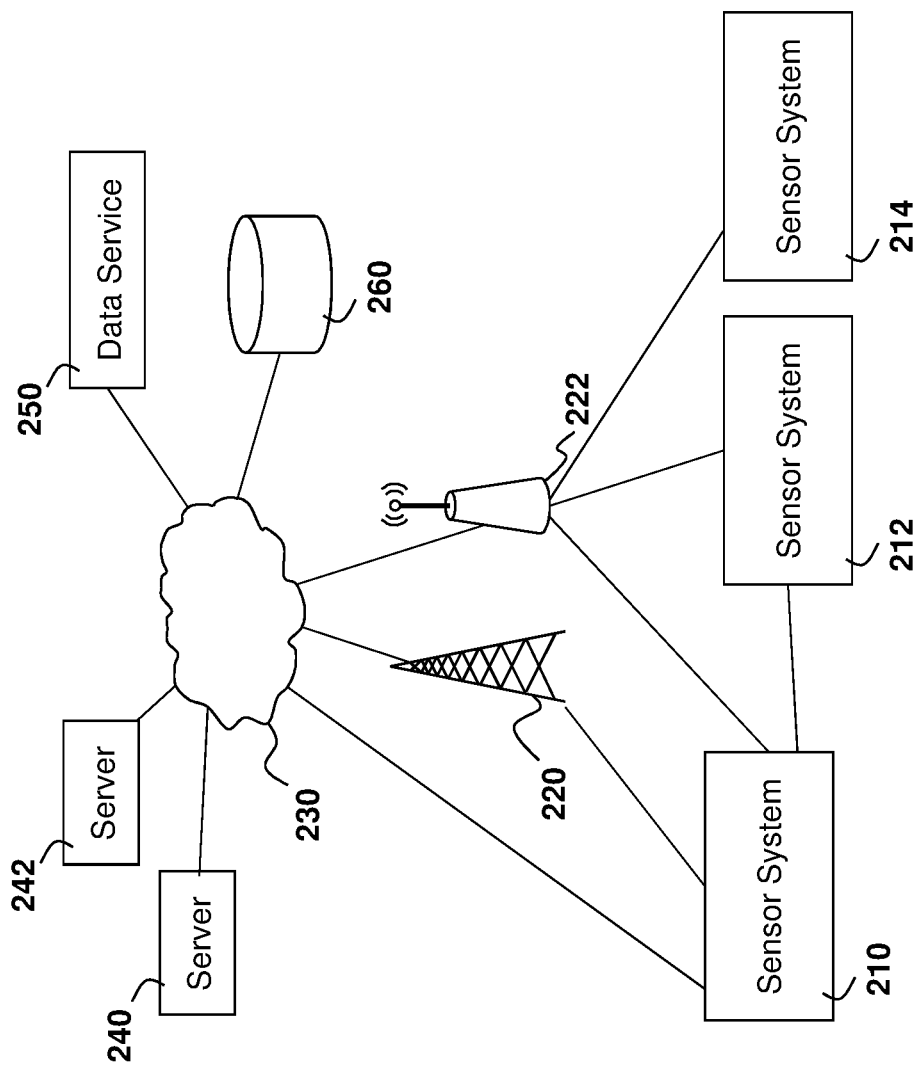
FIG. 2 is a block diagram showing an example environment for a gateway and sensor apparatus in accordance with the embodiments of the present disclosure.

Referring to FIG. 2, three sensor systems, namely sensor system 210, sensor system 212, and sensor system 214 are provided.

In the example of FIG. 2, sensor system 210 may communicate through a cellular base station 220 or through an access point 222. Access point 222 may be any wireless communication access point.

Further, in some embodiments, sensor system 210 could communicate through a wired access point such as Ethernet or fiber, among other options.

The communication may then proceed over a wide area network such as Internet 230 and proceed to servers 240 or 242.

Similarly, sensor system 212 and sensor system 214 may communicate with servers 240 or server 242 through one or both of the base station 220 or access point 222, among other options for such communication.

In other embodiments, any one of sensor systems 210, 212 or 214 may communicate through satellite communication technology. This, for example, may be useful if the sensor system is travelling to areas that are outside of cellular coverage or access point coverage.

In other embodiments, sensor system 212 may be out of range of access point 222, and may communicate with sensor system 210 to allow sensor system 210 to act as a relay for communications.

Communication between sensor system 210 and server 240 may be one directional or bidirectional. Thus, in one embodiment sensor system 210 may provide information to server 240 but server 240 does not respond. In other cases, server 240 may issue commands to sensor system 210 but data may be stored internally on sensor system 210 until the sensor system arrives at a particular location. In other cases, two-way communication may exist between sensor system 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor systems 210, 212, 214, etc. For example, the server may be located essentially anywhere so long as it has network access to communicate with sensor systems 210, 212, 214, etc.

Server 240 may, for example, be a fleet management centralized monitoring station. In this case, server 240 may receive information from sensor systems associated with various trailers or cargo containers, providing information such as the location of such cargo containers, the temperature within such cargo containers, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be a trailer tracking and maintenance server which is used to determine how far a trailer has traveled and whether any parts of the trailer need to be maintained.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor systems 210, 212, or 214 for processing at those sensor systems.

Utilizing a sensor system such as that described above, in accordance with one embodiment of the present disclosure, synchronization of communication between the gateway and sensor module is performed to reduce power consumption.

Figure 3:
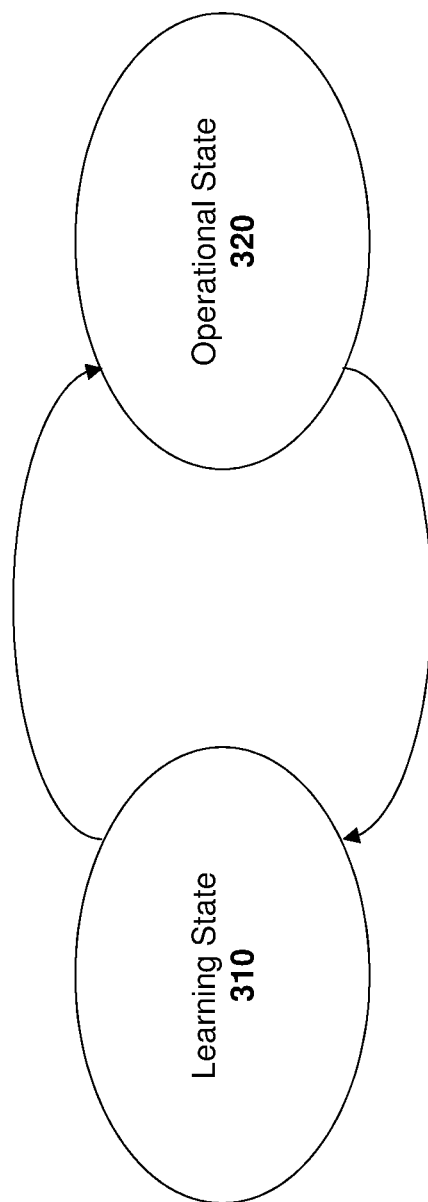
FIG. 3 is a state diagram showing transitioning between a learning state and an operational state.

The coordination of communication between a sensor module and the gateway may occur in several ways. In accordance with one embodiment of the present disclosure, the gateway and the sensor modules operate in one of two states. Reference is now made to FIG. 3.

In the embodiment of FIG. 3, one or both of the gateway or sensor module can start in a learning state 310 and then proceed to an operational state 320 when learning has been completed. The learning state 310 allows the gateway and/or sensor modules to learn the communication intervals of the other of the gateway and/or sensor modules. Such communication intervals form a timing profile for communications with the other of the gateway and/or sensor modules. The operational state 320 is the low power operation of the gateway or sensor modules when learning has been completed.

In one embodiment, the learning state 310 can be entered automatically when the sensor system is installed on a vehicle.

In other embodiments, the learning state 310 may also be entered based on predetermined criteria or based on user input. For example, if a wireless gateway detects a new sensor module after an initial learning phase has been completed, the wireless gateway may re-enter the learning state 310 in order to determine the configuration/timing profile of the new sensor module.

In other cases, the entering of the learning state 310 may occur based on an input. Such input may be received through wired or wireless techniques including a reset button on the gateway or sensor module, a communication from the operator of the vehicle, a communication from a network operator at a central monitoring station, among other options.

In some cases, learning state 310 could be a passive learning state. In this regard, the gateway could keep the radio on for the entire learning state and listen for transmissions from the sensor module. The gateway, by leaving its radio on for a time duration could learn the behavior/timing profiles of the sensor module during such time duration.

Similarly, the sensor module could have its radio remain on for the entire learning state and listen for transmissions from the gateway. The sensor module could then know when the gateway is expected to transmit.

Further, in some embodiments, the sensors themselves could also transition into a learning state in which dummy data is transmitted at the regular interval of the sensor to enable learning.

During the learning state 310, transmissions from the gateway may include a timestamp or clock value from the gateway. The gateway may, in some embodiments, be considered as the "master clock" and therefore the sensor modules could synchronize their clocks to the gateway clock.

In other embodiments, the master clock could be set based on other criteria, such as a Global Navigation Satellite System (GNSS) or other location determination system. Such signals for a location determination system typically include a timestamp, which could be used by one or both of the gateway or sensor module to synchronize their clocks.

Rather than implicit learning, in some embodiments the learning state 310 could utilize an explicit exchange of messaging between the gateway and the sensor module for configuration. Thus, for example, when a sensor module is paired to a gateway, the gateway may send a schedule element that contains multiple wake-up schedules/timing profiles depending on the state of the gateway. Here, the state of the gateway may indicate whether the gateway is in motion or stationary, for example. The gateway may therefore send a schedule based on its stationary behavior, its in-motion behavior, and its behavior with regards to critical alarm states.

An example schedule for each of the various states of the gateway may include a known time offset or reference timestamp, a type of message, including for example alarm or normal, a wake-up duration, a communication mode such as transmit and receive or receive only, and a duty cycle between wake-up times. The message may contain less information or more information in some embodiments.

During this explicit learning phase, the "normal" wake-up of the gateway would allow the gateway to send the schedule type to the sensor module. The sensor module would use this information for the next wake-up. The sensor module could then use the wake-up period to send sensor data.

During a "alarm" wake-up, the gateway would wake-up and listen for alarms. By using a wake-up schedule, the alarm could be detected earlier by reducing potential latency caused by longer wake-up schedules for the sensor data.

Therefore, either the explicit or implicit learning state 310 allows for the synchronization of communications between with the wireless sensor module and gateway. Information may thereafter be shared between the sensor module and gateway using profiles that include update intervals, wake-up durations, among other data. Such update intervals and wake-up duration may further vary based on a motion mode, as described below.

As used herein, a timing profile is a configured schedule of wake-up period and a duration of how long the radio receiver will remain on for each wake-up.

In some embodiments, the timing profile could be a fixed profile. In this case, the profile may be set during manufacturing time.

In other cases, the timing profile may be learned only once during learning state 310.

In still other embodiments, the timing profile could be learned and updated dynamically. For example, if either the sensor module or the gateway detect that the communication timing profile has changed for whatever reason, the gateway or sensor module may re-enter the learning state 310 to learn the profile again.

The learning state 310 may be complete after explicit messaging has been exchanged between the sensor module and gateway, or after a particular threshold condition has been met at both the gateway and sensor module. For example, the threshold condition may include the predicted profile behaving as expected for a predetermined time duration, after which the gateway and/or sensor module can assume that such profile will continue indefinitely while the vehicle is in its current state. In other embodiments, the threshold condition could be a minimum time duration. Other examples are possible.

Therefore, after making a determination that the timing profile has been learned, the gateway and/or sensor module can transition from the learning state 310 to the operational state 320. Operational state 320 allows for operation while conserving power resources.

Further, in some embodiments, the vehicle or platform for the sensor system may operate in different modes. In this case, the learning state may occur for each of different modes of operation. For example, in some cases the behavior of the gateway may differ based on a motion mode, that is whether a vehicle is stationary or moving.

Figure 4:
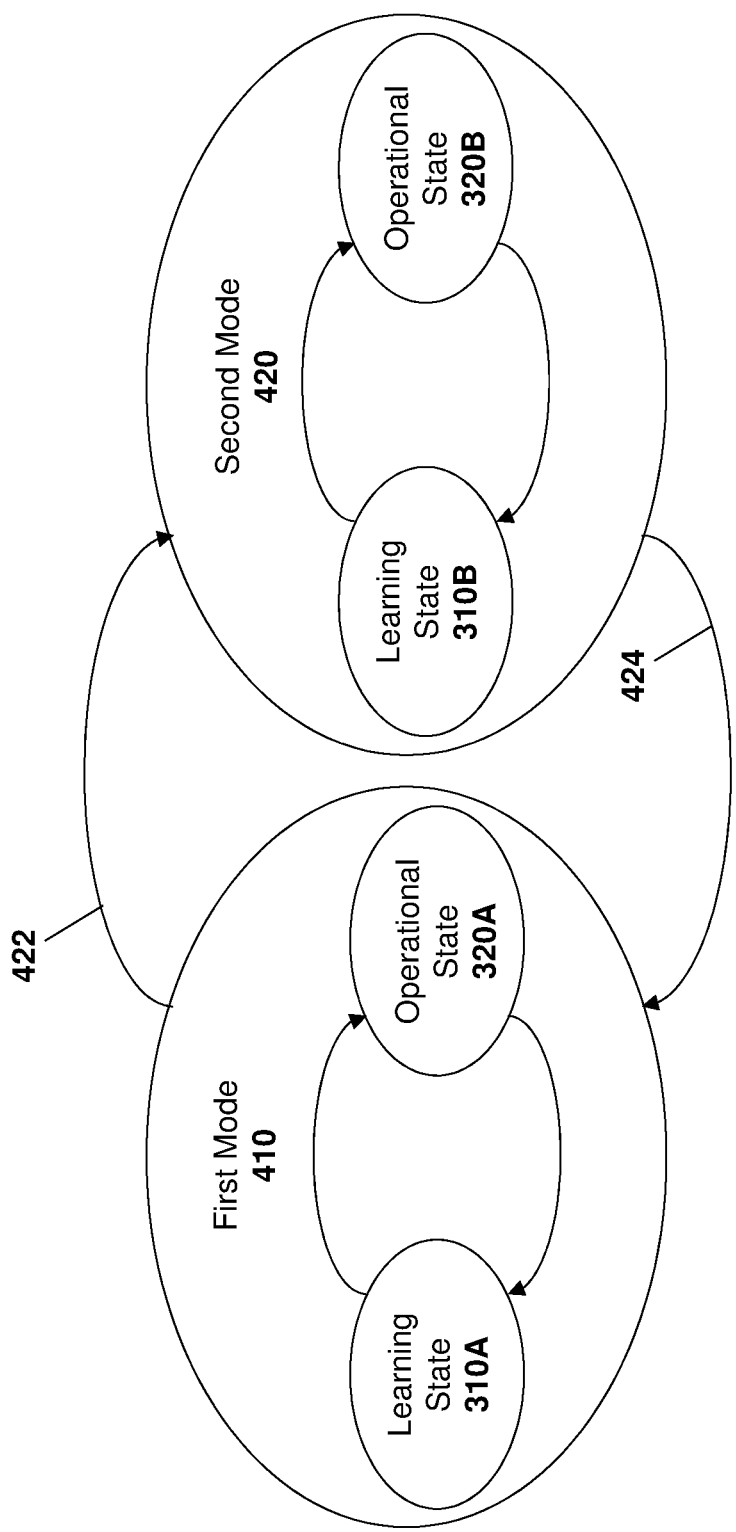
FIG. 4 is a state diagram showing a sensor system operating in a first or second mode, where each mode has a learning and operational state.

Referring to FIG. 4, the sensor system may operate in different modes. In the example of FIG. 4, the sensor system that may operate in a first mode 410 or a second mode 420, and may transition between the two modes, as shown for example by arrows 422 and 424. However, this is a simplified diagram and in other embodiments, more than two modes may exist for the sensor system.

For example, in the first mode 410 the sensor system may be moving. In the second mode 420 the sensor system may be stationary. In each mode, various sensor modules or gateways may have different operating parameters. For example, a tire pressure monitoring system (TPMS) may wish to make more frequent reports while a vehicle is in motion than while the vehicle is stationary.

Based on the different timing profiles in each mode, a different learning state and operational state may exist in each mode. As shown in FIG. 4, first mode 410 includes a learning state 310A and operational state 320A. Thus, when first entering the first mode, or on sensor changes, for example, the sensor system may enter learning state 310A to learn the timing profile for the gateway and/or sensor modules.

Similarly, in a second mode 420, a learning state 310B may be entered when the system is installed or on sensor changes, for example. In state 310B, the sensor system could learn the timing profiles for the gateway and/or sensor modules. Once learned, the system may transition to the operational state 320B while operating in the second mode 420.

While the embodiment of FIG. 4 shows only two modes, in other cases, the state transitions may be less granular. For example, the timing profile may change based on factors such as the speed of the vehicle. Thus, if the vehicle is stationary then a first timing profile for a first mode may be used. If the vehicle is moving at a first speed that falls below a threshold value, then the vehicle may utilize a second timing profile in a second mode. If the vehicle is moving at a third speed that it is above the threshold value, then the sensor system may operate using a third timing profile in a third mode.

In other embodiments, modes may be dependent on factors other than speed. For example, modes may be dependent on whether a trailer is loaded or unloaded in some cases. In other cases, a type of cargo in a trailer may create different modes. Other options are possible.

A timing profile may be determined based on various factors. For example, in cases where sensor modules wake-up only on critical events and sleep during the rest of the period, sampling at a first frequency may be reasonable. A non-limiting example may include taking a sample at a sample cycle of one minute, which may be sufficient for the operation of the system. The frequency of sampling would depend on the type of sensor and a use case. Further, time periods can be tuned based on the application.

Figure 5:
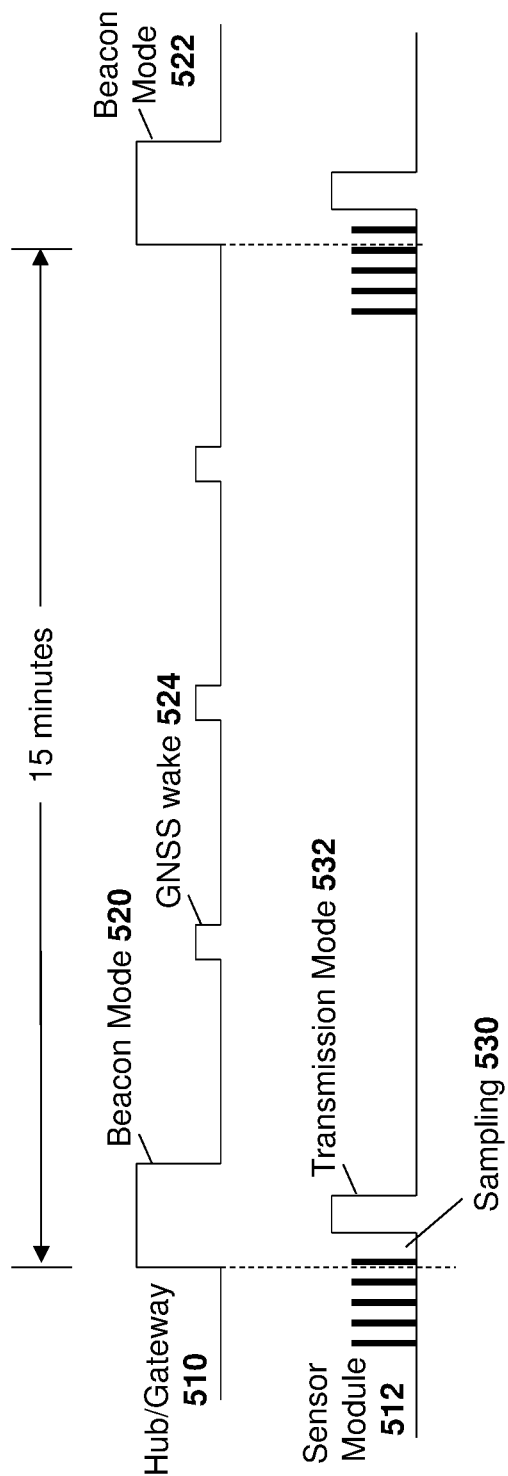
FIG. 5 is a timing diagram showing a first embodiment in which a sensor module oversamples a beacon signal from a gateway.

Once learned, timing profiles can be used based on the mode the sensor system is operating in. Reference is now made to FIG. 5, which shows an example timing diagram showing one use case in which a vehicle is in motion, and in which a gateway wakes up every 15 minutes to transmit a beacon to receive communication from sensor modules. In particular, a gateway 510 and a sensor module 512 each have a wake-up profile.

Thus, in the example of FIG. 5, gateway 510 enters a beacon mode 520 at a first time and a beacon mode 522 at a second, subsequent time. The gateway 510 may further turn on its radio for other purposes between these beacon modes, such as for a GNSS fix, shown as GNSS wake 524 in the embodiment of FIG. 5. Between these events, the radio for gateway 510 is off.

After learning the beacon modes during a learning state, for example learning state 310A from FIG. 4, a sensor module 512 may wake-up its radio just prior to the periodic wake-up of the gateway module. This is shown, for example, by sampling arrows 530. Arrows 530 indicate a periodic wake-up and sampling of the signal from the wireless gateway 510.

In accordance with the various embodiments of the present disclosure, one implementation relies on the received signal strength indicator (RSSI) and/or preamble detector in a low power mode to determine whether communication is being sent to a radio. Such RSSI and/or preamble detection may be made within a radio core, such as radio controller 132 or radio controller 172 from FIG. 1.

Therefore, the sampling shown by arrow 530 does not require the processor of the sensor module to be woken until a signal is detected, thereby saving power resources. Specifically, using sampling, the gateway and/or sensor module can operate in a low power mode without waking a power-hungry processor until a signal is detected that is directed to the gateway and/or sensor module.

In various embodiments, the receive power level may be tuned or calibrated to ensure proper RSSI detection. Further, in some embodiments the transmit power and antenna gain may be dynamically adjusted to optimize or filter the detection of the signal from sensor module or the gateway.

Sampling may be done periodically. For example, the sampling may wake-up the receiver core of the sensor module for a period of 200 ms every second until a signal is received. However, this example is non-limiting, and in other cases the sampling may occur for different durations and at different frequencies.

Thus, in accordance with the embodiment of FIG. 5, sampling (oversampling) may start a predetermined time prior to the expected beacon signal being sent from the gateway 510. Once sampling starts, as shown by arrows 530, the signal is sampled until the beacon signal is received, or until a timeout has occurred. In this case, the beacon signal would typically last longer than the off period during the sampling interval, and thus in the example of FIG. 5 the beacon signal would typically last longer than 800 ms.

However, in some embodiments, rather than oversampling, the radio may be on for a time duration.

The signal, also referred to as a preamble, from gateway 510 may consist of various information. For example, the beacon signal may provide both an asset identifier to identify the gateway, as well a sensor identifier to identify the target of the signal. The beacon signal may further provide information about the clock of the gateway 510 in some embodiments.

The gateway may then keep transmitting the preamble until either it hears back from the sensor module or until the beacon mode 520 ends.

In accordance with the embodiment of FIG. 5, sensor module 512 may queue all sensor events that it has received and may store such sensor events. For example, such sensor events may be stored in memory 180 from the embodiment of FIG. 1.

Once the beacon signal or preamble is received, the sensor module may then enter into a transmission mode 532 in which the receipt of the preamble is acknowledged and the stored sensor events are forwarded to the gateway 510. Such behavior may be referred to as a store-and-forward architecture.

Therefore, in accordance with the embodiment of FIG. 5, the sensor module wakes up in a low power mode without powering on its processor until the radio core sampling mode has detected the preamble from the gateway. At this point, the sensor module may wake-up its processor and perform the forwarding of the sensor data to the gateway.

The gateway 510 may receive communications from a plurality of sensor modules 512. In one embodiment, gateway 510 may store data received from the sensor modules in a memory at the gateway. For example, the memory may be a memory associated with the processor or may be a flash memory at the radio subsystem, among other options. The collected data may then be forwarded to a server or cloud service. Such behavior may be referred to as a store-and-forward architecture.

Figure 6:
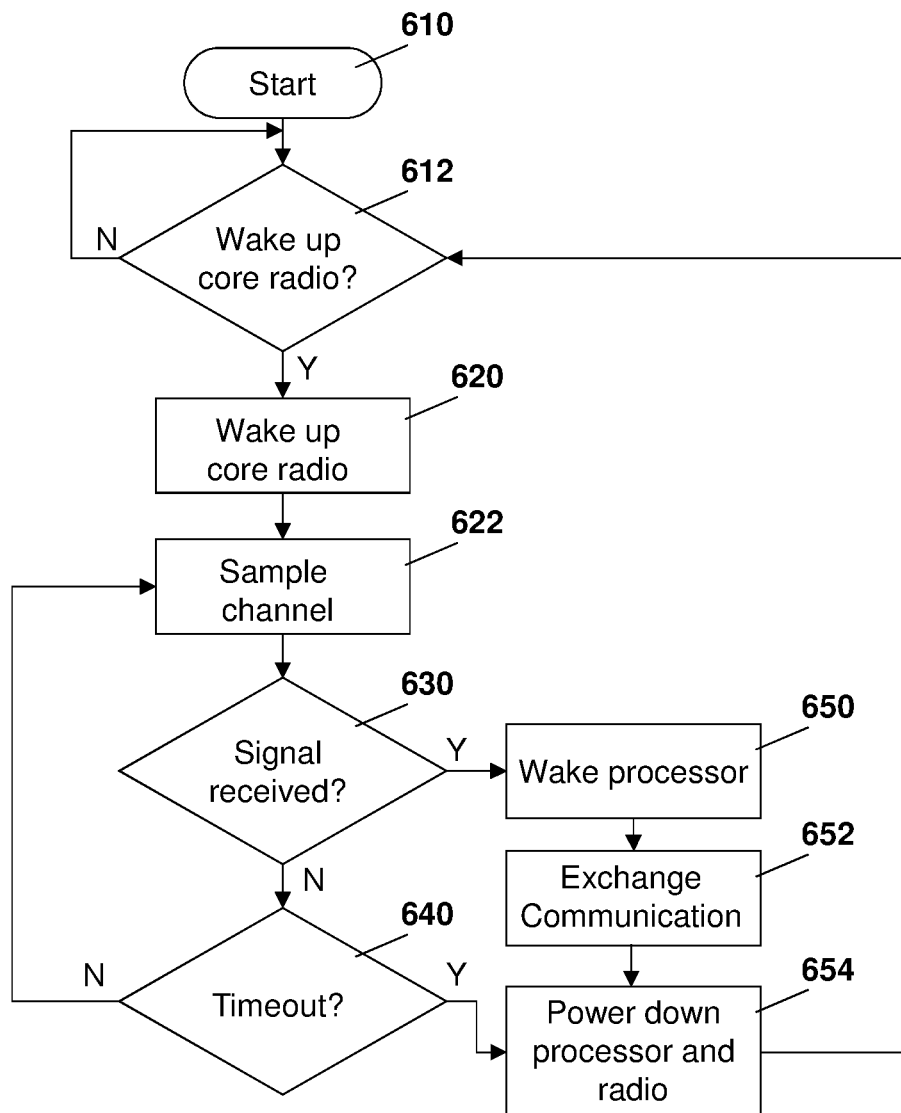
FIG. 6 is a process diagram showing a process at a sensor module for communicating with a gateway in a first mode of operation.

References is now made to FIG. 6, which shows the process at the sensor module while a vehicle is in motion. The process of FIG. 6 starts at block 610 and proceeds to block 612 in which a check is made to determine whether it is time to wake-up the radio core based on the timing profile for the gateway. As will be appreciated, such a check may be a low power clock which may wake-up the radio core at set times.

If, in block 612, it is not time to wake-up the radio core, the process proceeds back to block 612 and continues to loop until the time has been reached to wake-up the radio core.

The process proceeds from block 612 to block 620 in which the radio core is awakened.

The process then proceeds to block 622 in which the radio core oversamples the communication channel. In particular, as described above, the oversampling may occur at specific frequency where the radio is turned on for a short period during such sample cycle. For example, the sample cycle may be for two seconds and the sampling may occur for 200 ms in some embodiments. However, this is only one example, and the frequency and on duration may be configurable or may be factory set to different values. Alternatively, the radio core could be turned on and could be kept on for a time duration in one embodiment.

From block 622, the process proceeds to block 630 in which a check is made to determine if a signal has been received. In particular, a check is made to determine whether the beacon preamble has been received from the gateway.

If, at block 630, it is determined that the preamble has not been received, the process proceeds to block 640 to determine whether a timeout has occurred.

From block 640, if a timeout has not occurred, the process proceeds back to block 622 in which the oversampling continues.

Conversely, if the preamble has been received, the process proceeds from block 630 to block 650 in which the processor of the sensor module is woken.

From block 650, communication may be exchanged between the gateway and sensor module at block 652. For example, such communication may include the stored sensor data from the sensor module. It may further include clock information from the gateway.

From block 652, once the communication exchange is finished, the processor and radio of the sensor module may be powered down at block 654. As used herein, when a sensor module is "powered down", this could mean that the sensor module uses little or no power. For example, the sensor module could have all functionality turned completely off, with the exception of a clock to trigger wake-up. Alternatively, powering down could mean entering a low power mode.

Also, if no preamble is received and a timeout is detected at block 640, the process can proceed to block 652 in which the radio is powered down.

From block 654 the process may then resume by proceeding back to block 612.

Figure 7:
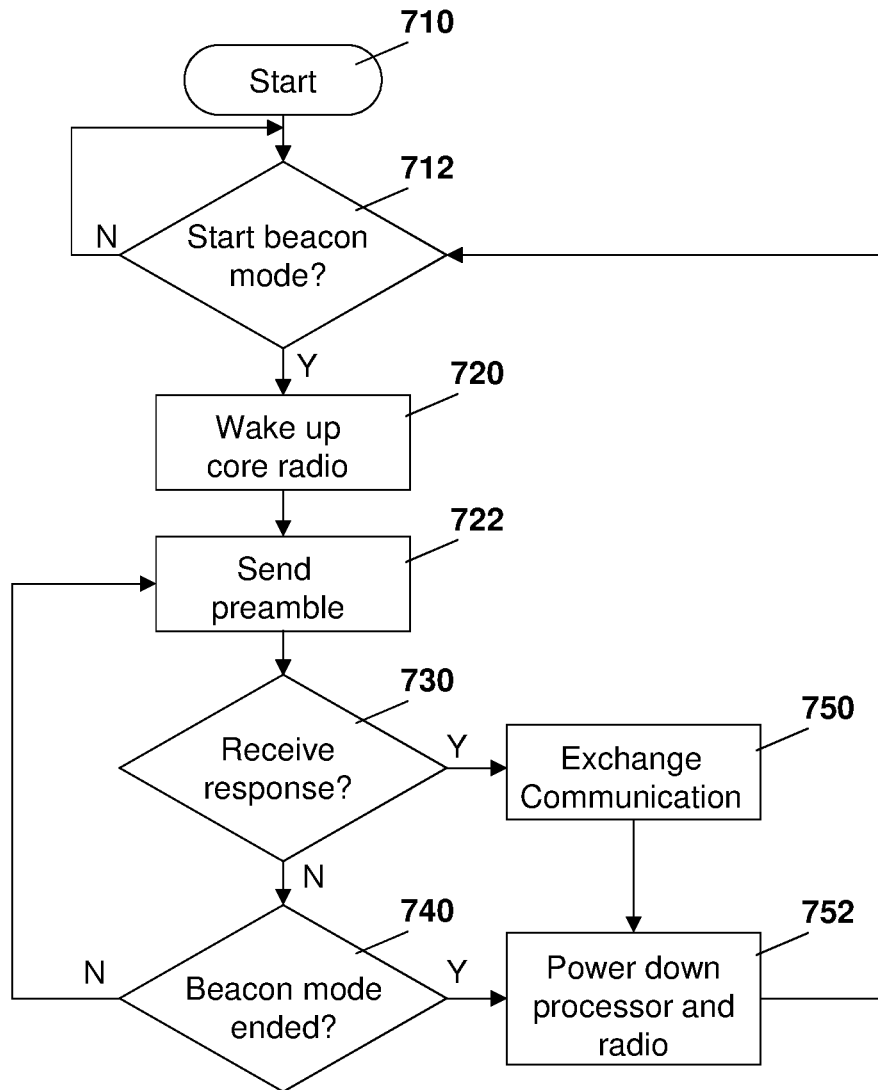
FIG. 7 is a process diagram showing a process at a gateway for communicating with a sensor module in a first mode of operation.

Reference is now made to FIG. 7, which shows a process for the operational state of a moving vehicle from the gateway perspective. As described above, the gateway on a vehicle in motion will enter a beacon mode periodically.

The process of FIG. 7 starts at block 710 and proceeds to block 712 in which a check is made to determine whether the beacon mode needs to be entered. If not, the process continues to loop on block 712 until the beacon mode needs to be entered. As with check 612 on the sensor module, the check at block 712 could be based on a low power clock which will wake-up the radio core and/or processor of the gateway.

From block 712, once it is time to enter the beacon mode, the process proceeds to block 720 in which the radio and typically the processor of the gateway wakes-up or is woken, for example by an external signal. The process then proceeds to block 722 in which the gateway may send the preamble.

From block 722 the process proceeds to block 730 in which a check is made to determine whether or not a response to the preamble has been received. If not then the process proceeds to block 740 in which a check is made to determine whether the beacon mode has ended.

From block 740, if the beacon mode has not ended and no preamble has been received at block 730, the process proceeds back to block 722 in which the preamble is resent then the process continues.

If a preamble is received, then the process proceeds from block 730 to block 750 in which communication exchange occurs. For example, such communication exchange may include the stored sensor data from the sensor module. It may further include clock information from the gateway.

Once communication has ended and the beacon mode is over, the process proceeds to block 752 in which the processor and radio are powered down. Powering downs could mean that the gateway uses little or no power. For example, the gateway could have all functionality turned completely off, with the exception of a clock to trigger wake-up. Alternatively, powering down could mean entering a low power mode.

From block 740, if the beacon mode has ended before a response to the preamble has been received, the process proceeds to block 752 and the processor and radio are powered down.

The process then proceeds from block 752 to block 712 to wait for the next beacon period.

When the sensor system enters into a different mode of operation, different timing profiles may be used. For example, if the mode of operation is based on motion of the vehicle (motion mode), the sensor system may move into the "stationary" profile when a detection is made that the vehicle is still. This detection may, for example, be based on a position location system within the gateway and/or the sensor module. It may also be based on signaling between the gateway and sensor modules. Thus if the gateway includes a positioning system, it may detect that the vehicle is stationary and signal this to the sensor modules. Other modes of operation may include time of day options, or whether it is light or dark, fine weather or not; or how the state of the batteries is within the separate components, among other options.

The sensor modules may further use their sensors to detect when the vehicle is stationary. For example, a vibration sensor on a bearing may detect no vibration for a threshold time period, which may signal to the sensor module that the vehicle is stationary.

Other options for detecting the mode change are possible.

Figure 8:
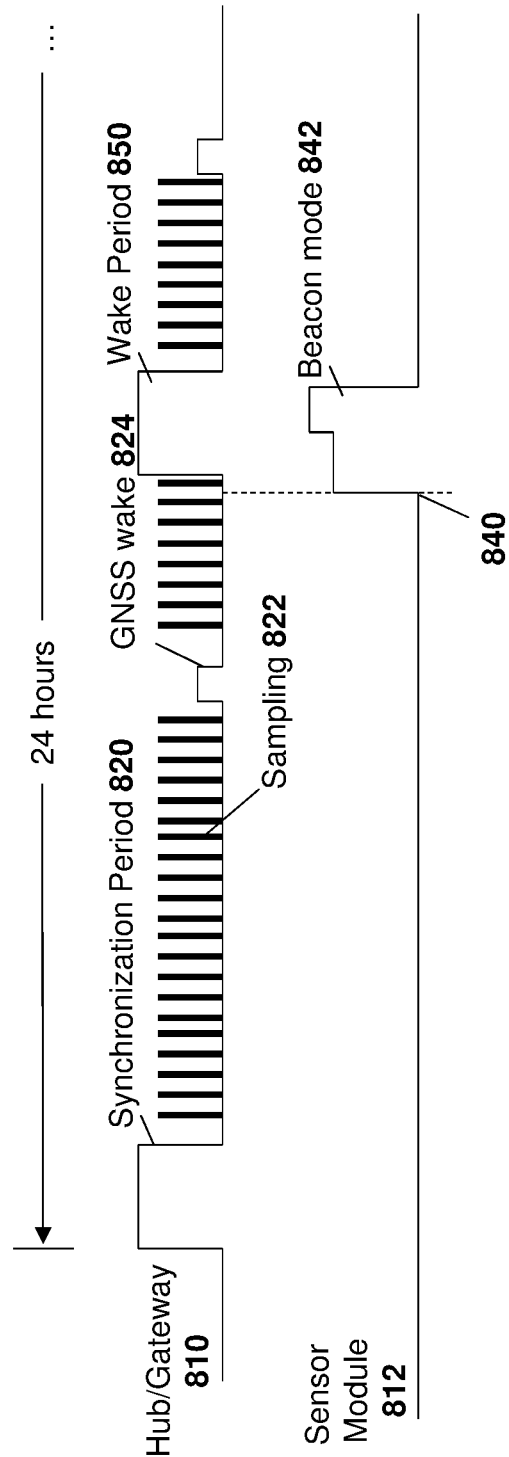
FIG. 8 is a timing diagram showing a second embodiment in which a gateway oversamples a beacon signal from a sensor module.

References is now made to FIG. 8, which shows an example timing diagram for timing profiles when a vehicle is stationary. When the sensor system is still, the sensor module may be in a low power mode or deep sleep and is only configured to wake-up if a critical event has occurred. For example, if the temperature on a vehicle falls below a certain threshold or rises above a threshold, or if a tire blows on a TPMS monitoring system, then a critical condition may exist and the sensor module may wake-up.

As seen in FIG. 8, the gateway 810 is configured to wake-up periodically, as shown by synchronization period 820. For example, the gateway may wake-up every 24 hours. The sensor module 812 may know such interval and it may also wake-up during this time period for synchronization purposes.

However, the if gateway only turned on every 24 hours the delay in reporting critical sensor events would typically be too long. Therefore, as seen in the embodiment of FIG. 8, after the synchronization period 820, the gateway 810 may periodically sample signals from sensor modules. For example, such sampling may occur every 15 minutes. The sampling is shown, for example, with arrows 822.

The wake-up during the sampling at arrows 830 may be done by the gateway radio core, such as radio controller 132 from FIG. 1. In this case, the processor of the gateway does not need to be woken up in order to save battery life on the gateway.

The gateway may further occasionally perform a position fix, shown by GNSS wake 824. For example, this may be done every three hours in one embodiment.

In accordance with the embodiment of FIG. 8, sensor module 812 detects a critical sensor event at time 840. It may then enter a beacon mode 842 in which a beacon is sent to the gateway 810. In some cases, the beacon may be sent at an expected sampling wake-up time for the gateway.

During sampling, the gateway may be turned on before the scheduled wake-up time. For example, in one embodiment the gateway may turn on the radio core 5 to 10 seconds before the scheduled sampling time. This could be done to account for clock drift in the separate components of the system.

The sensor module, upon wake-up based on a critical sensor event, may keep transmitting the preamble until the gateway responds with a preamble response (or any other transmission to acknowledge the request) or until a defined timeout has occurred.

Upon detecting the preamble, the gateway may wake-up the processor in a wake period 850. Communication may then be exchanged with the sensor module. Gateway 810 may then perform a server update and may then return to the sleep state.

As will be appreciated by those skilled in the art, the wake-up time in the embodiments of FIGS. 5 to 8 will typically take into account the device boot time and may account for clock drift as well.

The process at each of the sensor module 812 and gateway 810 is described below with regards to FIGS. 9 and 10.

Figure 9:
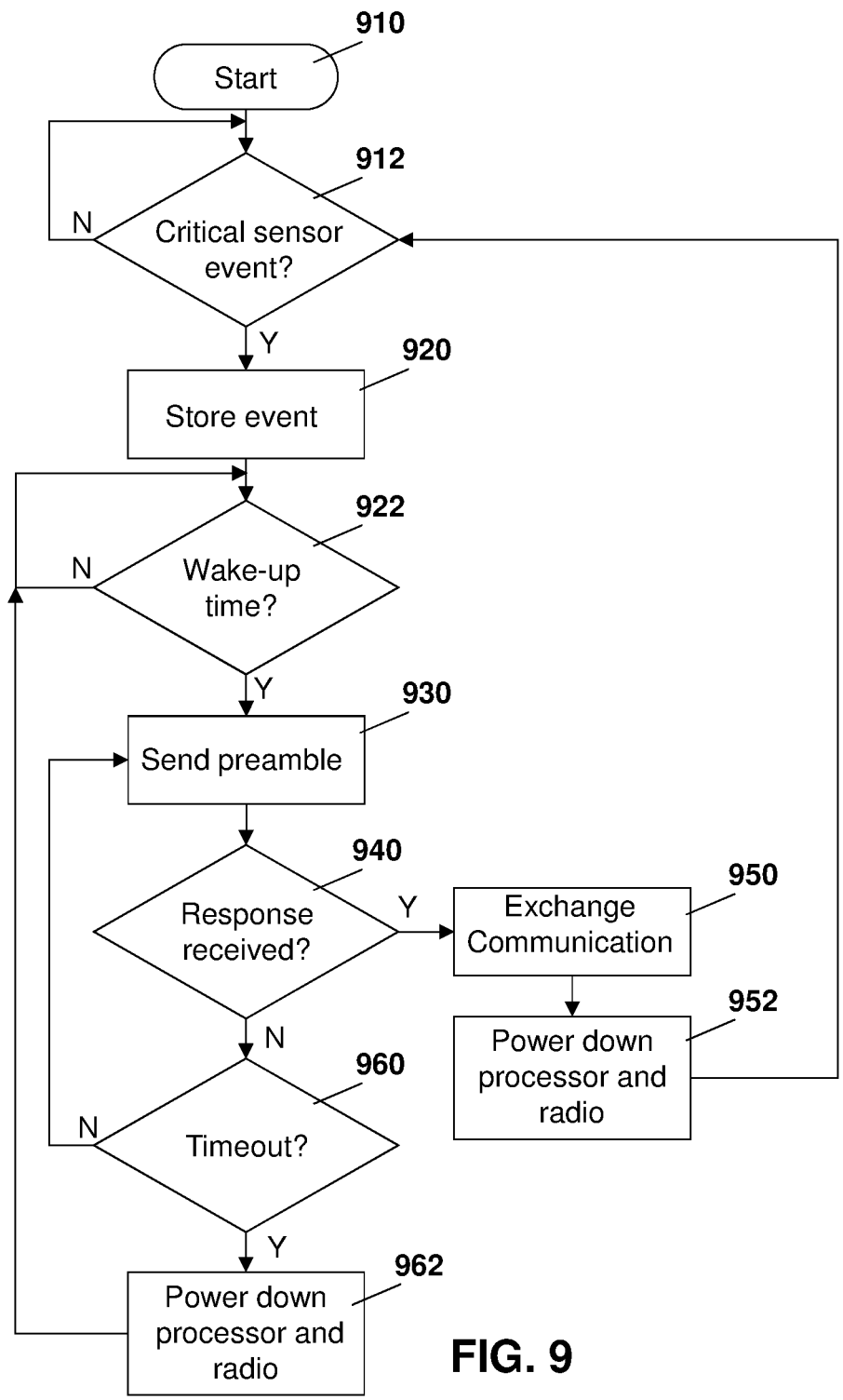
FIG. 9 is a process diagram showing a process at a sensor module for communicating a critical sensor event.

Reference is now made to FIG. 9, which shows a process at sensor module 812. The process of FIG. 9 starts at block 910 and proceeds to block 912 in which a check is made to determine whether a critical sensor event has been received. If not, the process continues to loop on block 912 until a critical sensor event is received.

From block 912, if a critical sensor event has occurred then the process proceeds to block 920 in which the event is stored.

The process then proceeds to block 922 in which a check is made to determine whether it is appropriate time for the gateway to wake-up. If not, the process proceeds to loop on block 922 until the appropriate time has been reached.

From block 922, if the appropriate time has been reached the process proceeds to block 930 in which the sensor module sends a preamble.

The process then proceeds to block 940 in which a check is made to determine whether a response has been received. If yes, the process proceeds to block 950 in which communication exchange occurs between the gateway and the sensor module. Such communication exchange may include providing the critical sensor data to the gateway.

The process then to block 952 in which the processor and radio power down. Again, this could mean that the sensor module uses little or no power. For example, the sensor module could have all functionality turned completely off, with the exception of a clock to trigger wake-up. Alternatively, powering down could mean entering a low power mode.

From block 952 the process may then proceed back to block 912 to wait for the next critical event.

Conversely, from block 940, if the response to the preamble has not been received then the process proceeds to block 960 in which a check is made to determine whether or not a communication timeout has occurred. If not, the process loops back to block 930 in which the preamble is re-sent.

From block 960, if a timeout has occurred then the process proceeds to block 962, in which the processor and radio are powered down. The process may then proceed back to block 922 to wait for the next transmission opportunity.

Figure 10:
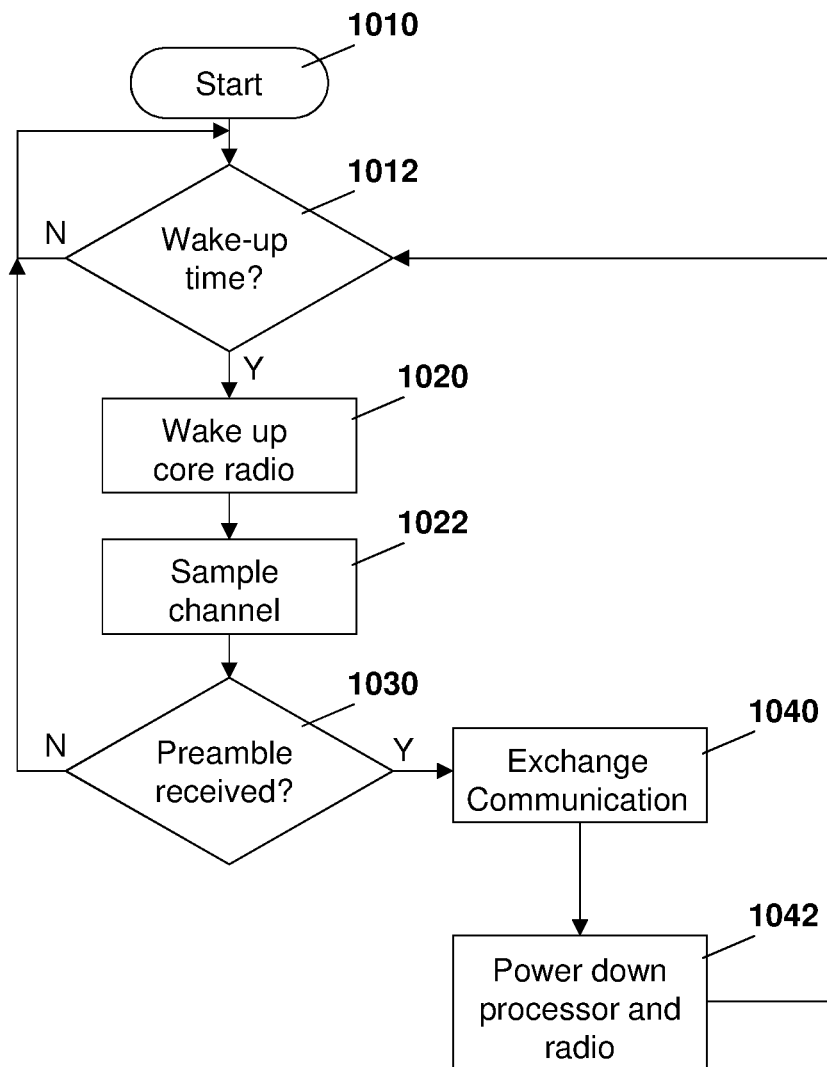
FIG. 10 is a process diagram showing a process at a gateway for receiving a critical sensor event.

Reference is now made to FIG. 10. From the gateway perspective, the process starts at block 1010 of the FIG. 10 and proceeds to block 1012. In block 1012, a check is made to determine whether it is time to wake-up the gateway. As will be appreciated, the wake-up time may occur periodically and the sampling of the channel may occur at a threshold time before the scheduled wake-up time. From block 1012, if the time has not yet been reached to wake-up the radio then the process proceeds back to block 1012 and continues to loop.

From block 1012, once the time has been reached then the process proceeds to block 1020 in which the radio core of the gateway is woken up.

The process then proceeds to block 1022 in which the channel is oversampled for a time duration.

From block 1022 the process proceeds to block 1030 in which a check is made to determine whether a preamble has been received. If not, the process proceeds to block 1012 and continues to wait for the next period to wake-up the radio.

Conversely, if a preamble has been received at block 1030 then the process proceeds to block 1040 in which communication exchange occurs between the gateway and sensor module. Such communication exchange may include receiving the critical sensor data at the gateway. At block 1040, communication may additionally be exchanged with the network servers such as servers 240 or 242 from FIG. 2.

The process then proceeds to block 1042 in which the processor and radio are powered down. Again, this could mean that the gateway uses little or no power. For example, the gateway could have all functionality turned completely off, with the exception of a clock to trigger wake-up. Alternatively, powering down could mean entering a low power mode.

From block 1042, the process then proceeds to block 1012 and continues to monitor the channel.

Thus, based on the above, the behavior of the gateway and/or sensor module may be varied based on the mode of operation of the vehicle. Further, in the operation mode 320, the battery of the gateway and/or sensor module is saved by only waking up periodically and sampling or oversampling the signal using a radio core prior to waking up the processor on the device.

To facilitate the operation of the embodiments above, the sensor module and gateway should typically remain synchronized. This may be done in several ways.

A first way to synchronize the clock on the gateway with the clock on the sensor modules is through messaging. For example, when the vehicle is in a stationary mode, the gateway may wake-up periodically, such as every 24 hours. During such wake-up, communication may be exchanged between the gateway and the sensor module. Such communication may include a clock signal or value from the gateway to the sensor module to allow the sensor module to update its timings.

Such messaging exchange may further occur during any other communication exchange. For example, timing information may be exchanged at block 652 of FIG. 6, block 750 of FIG. 7, block 950 of FIG. 9, or block 1040 of FIG. 10.

In one embodiment, the timing settings may represent a clock used by a processor of the gateway. This may be an internal clock on the gateway. Further, such internal clock may be synchronized to a positioning system clock or a server clock in some cases.

In other embodiments, a clock on the radio may be synchronized. For example, in the embodiment of FIG. 6, the sensor module wakes up and starts oversampling the signal. It is expecting that the signal will be oversampled for a fixed number of intervals. For example, in the embodiment of FIG. 6, the sensor module may wake-up five seconds prior to the signal being transmitted and may therefore expect that five sampling periods occur prior to the preamble being received. If the preamble is received after three samples then this may indicate a clock drift has occurred and the sensor module may update its timing settings on the radio.

Similarly, if the preamble is received after eight sampling periods then this may also indicate that clock drift has occurred and the sensor module clock may be adjusted the other way in order to keep the clocks synchronized.

Further, the beacon modes 520 from FIG. 5 or 810 from FIG. 8 may occur even if there is no data to be exchanged. This keeps the clocks generally synchronized.

The above therefore provides that time correction is done at multiple levels in the system, including receipt radio transceiver level, the host processor with a Global Navigation Satellite System/Network Time Protocol (GMSS/NTP), among other options. This renders the overall system synchronized while keeping power levels of the minimum.

Data may be exchanged with servers such as server 240 or 242. Such server may be any network node. For example, one simplified server that may perform the embodiments described above is provided with regards to FIG. 11.

Figure 11:
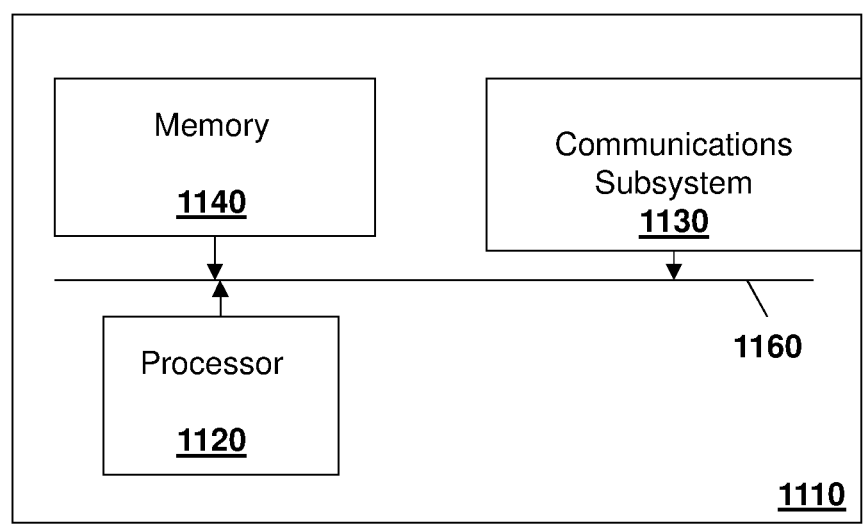
FIG. 11 is a block diagram of an example computing device capable of being used in accordance with the embodiments of the present disclosure.

In FIG. 11, server 1110 includes a processor 1120 and a communications subsystem 1130, where the processor 1120 and communications subsystem 1130 cooperate to perform the methods of the embodiments described herein.

Processor 1120 is configured to execute programmable logic, which may be stored, along with data, on server 1110, and shown in the example of FIG. 11 as memory 1140. Memory 1140 can be any tangible, non-transitory computer readable storage medium, such as optical (e.g., CD, DVD, etc.), magnetic (e.g., tape), flash drive, hard drive, or other memory known in the art.

Alternatively, or in addition to memory 1140, server 1110 may access data or programmable logic from an external storage medium, for example through communications subsystem 1130.

Communications subsystem 1130 allows server 1110 to communicate with other devices or network elements.

Communications between the various elements of server 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a sensor module within a sensor system for communicating with a gateway, the method comprising:
storing a timing profile for communications with the gateway, wherein the timing profile is derived from a learning state on the sensor system, the learning state comprising:
turning on a radio of the sensor module for a first time duration;
detecting a beacon signal from the gateway in a plurality of cycles; and
deriving the timing profile based on the detecting;
powering down a processor of the sensor module;
waking a radio core of the sensor module at a threshold time prior to the beacon signal being expected from the gateway;
sampling a channel for the beacon signal at the radio core while the processor of the sensor module is powered down;
if the beacon signal is detected:
waking the processor on the sensor module;
exchanging communication with the gateway; and
powering down the processor and radio core upon completion of the exchanging communication.

2. The method of claim 1, wherein the timing profile is received in a message from the gateway.

3. The method of claim 1, wherein the sampling comprises turning on the radio core periodically for a first portion of a sample cycle and turning off the radio core for a remaining portion of the sample cycle.

4. The method of claim 3, wherein the beacon signal is longer than the remaining portion of the sample cycle.

5. The method of claim 3, wherein the sampling utilizes a preconfigured received signal strength indicator threshold.

6. The method of claim 3, further comprising:
adjusting a clock on the sensor module based on a number of sampling cycles that pass before the beacon signal is detected.

7. The method of claim 1, wherein the beacon signal includes a clock value, the method further comprising adjusting timing on the sensor module based on the clock value received in the beacon signal.

8. The method of claim 1, wherein the sensor module and gateway are both power limited devices.

9. A sensor module within a sensor system configured for communicating with a gateway, the sensor module comprising:
a processor; and
a communications subsystem,
wherein the sensor module is configured to:
store a timing profile for communications with the gateway, wherein the timing profile is derived from a learning state on the sensor system, during the learning state the sensor module being configured to:
turn on a radio of the sensor module for a first time duration;
detect a beacon signal from the gateway in a plurality of cycles; and
derive the timing profile based on the detecting;
powering down the processor;

wake a radio core within the communications subsystem of the sensor module at a threshold time prior to the beacon signal being expected from the gateway;

sample a channel for the beacon signal at the radio core while the processor is powered down;

if the beacon signal is detected:
- wake the processor on the sensor module;
- exchange communication with the gateway; and
- power down the processor and radio core upon completion of the exchanging communication.

10. The sensor module of claim 9, wherein the timing profile is received in a message from the gateway.

11. The sensor module of claim 9, wherein the sensor module is configured to sample by turning on the radio core periodically for a first portion of a sample cycle and turning off the radio core for a remaining portion of the sample cycle.

12. The sensor module of claim 11, wherein the beacon signal is longer than the remaining portion of the sample cycle.

13. The sensor module of claim 11, wherein the sensor module is configured to sample by using a preconfigured received signal strength indicator threshold.

14. The sensor module of claim 11, wherein the sensor module is further configured to:
- adjust a clock on the sensor module based on a number of sampling cycles that pass before the beacon signal is detected.

15. The sensor module of claim 9, wherein the beacon signal includes a clock value, the sensor module further configured to adjust timing on the sensor module based on the clock value received in the beacon signal.

16. The sensor module of claim 9, wherein the sensor module and gateway are both power limited devices.

17. A non-transitory computer readable medium for storing instruction code, which, when executed at a sensor module cause the sensor module to:
- store a timing profile for communications with the gateway, wherein the timing profile is derived from a learning state on the sensor system, during the learning state the sensor module being configured to:
  - turn on a radio of the sensor module for a first time duration;
  - detect a beacon signal from the gateway in a plurality of cycles; and
  - derive the timing profile based on the detecting;
- powering down a processor of the sensor module;
- wake a radio core of the sensor module at a threshold time prior to the beacon signal being expected from the gateway;
- sample a channel for the beacon signal at the radio core while the processor of the sensor module is powered down;
- if the beacon signal is detected:
  - wake the processor on the sensor module;
  - exchange communication with the gateway; and
  - power down the processor and radio core upon completion of the exchanging communication.

* * * * *